Dec. 29, 1942.   P. R. HOOPES   2,306,806
SELF-LOCKING NUT
Filed Feb. 7, 1941

INVENTOR.
Penrose R. Hoopes
BY
Synnestvedt & Lechner
ATTORNEYS

Patented Dec. 29, 1942

2,306,806

UNITED STATES PATENT OFFICE 2,306,806

SELF-LOCKING NUT

Penrose R. Hoopes, Philadelphia, Pa.

Application February 7, 1941, Serial No. 377,779

4 Claims. (Cl. 151—21)

This invention relates to self-locking nuts and a method for manufacturing the same, the invention being adaptable to threaded nut members for cooperation with bolts, studs, threaded rods or the like.

One of the primary purposes of the invention is the provision of a self-locking nut of unitary construction, adapted for engagement with a plurality of threads on a mating screw and arranged to resiliently exert an axial pressure on the engaging screw threads, whereby loosening of the nut from vibration, shocks or other mechanical forces is prevented.

In connection with the above the invention also has in view providing a self-locking nut of the character mentioned in which the axial thread pressure is substantially uniform circumferentially of the nut, and preferably also from turn to turn.

Still further, the invention provides a nut of this character having minimum size and weight for a given length of thread engagement.

Another object of the invention is to provide a method for fabricating nuts having the characteristics described, which method may be carried out with ease and in an economical manner.

How the foregoing and other objects and advantages are attained will be apparent from the following description, referring to the accompanying drawing, in which—

The preferred form of nut, as shown in Figures 1 to 4 inclusive, comprises a helically wound strip forming a plurality of turns or convolutions 9 which are internally threaded, as indicated at 10, to cooperate with a complementary thread such as shown at 11 (Figure 4) formed on a bolt 12. The outer periphery of the nut is desirably shaped to polygonal form, such as the hexagonal form clearly appearing in Figures 1 and 2, so as to cooperate with a wrench or similar tool.

Figure 1:
Figure 1 is a side elevational view of a nut formed in accordance with the present invention.
Figure 2:
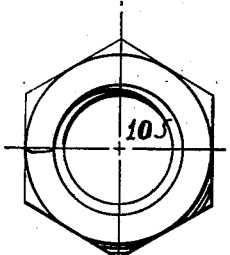
Figure 2 is an end elevational view taken from the right of Figure 1.
Figure 3:
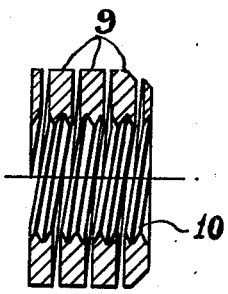
Figure 3 is an axial sectional view of the nut of Figures 1 and 2.
Figure 4:
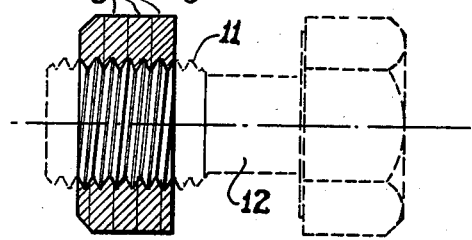
Figure 4 is a sectional view of the nut of Figures 1 to 3 in the condition when threaded onto a bolt.

The internal threading of the nut, provided by tapping, or otherwise, is arranged so as to mate with the screw thread of the bolt for which the nut is designed when the convolutions of the nut are in substantial contact with each other, as appears in Figure 4. The strip material of which the helix is wound has flexibility and elasticity such that, when not applied to a bolt and without application of other compression or tension force, the convolutions separate and take up a position of rest in spaced relation in the manner clearly shown in Figures 1 and 3. This elasticity, therefore, provides for thread interengagement between the nut and bolt under axial pressure around the entire circumference of the bolt, throughout a plurality of turns.

From Figures 3 and 4 it will be seen that the several turns of the nut are of parallel-sided section, this being of importance in providing a substantially solid nut body when drawn up or tightened on a mating thread.

When threaded on a bolt, the bolt thread serves to draw the convolutions of the nut together, in effect closing the normally open helical coil into a solid cylindrical, internally threaded tube and presenting a substantially unbroken external and internal contour. This nut may readily and effectively be tightened, as with a wrench, and retains its grip notwithstanding severe and prolonged vibration.

An important advantage lies in the fact that the gripping pressure is provided by axial expansion of the nut, affording uniform pressure over an extended length of the threading, and thereby avoiding difficulties encountered with certain prior self-locking nuts, in which the gripping pressure was localized. Employment of this axial pressure, distributed over a substantial length of the thread interengagement is also of advantage in providing effective gripping without radial expansion or contraction, which, in certain prior nuts, has resulted in distortion of the external contour, rendering it difficult or impossible to use a standard wrench.

From the foregoing it will be seen that the nut of this invention provides a locking force which is completely balanced both circumferentially and axially of the mating thread, so that there is no tendency for the nut to cock or assume a skewed position when threaded onto a bolt and tightened in place.

Figure 5:
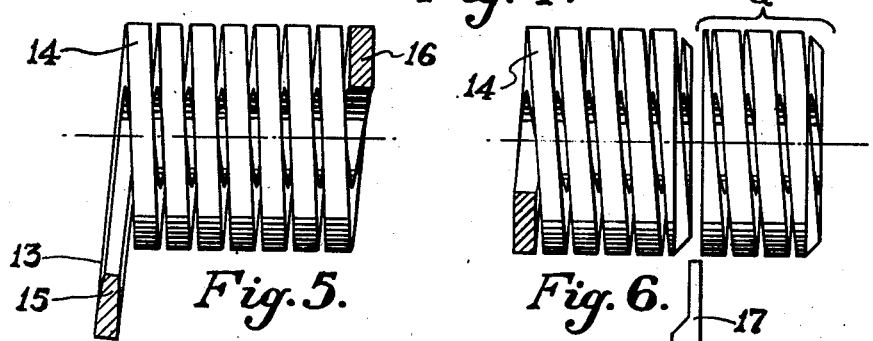
Figures 5, 6, 7 and 8 are views illustrating four stages in the manufacture of the nut shown in Figures 1 to 4.

In manufacturing the improved nut of this invention, I prefer to helically wind strip material 13 to form a helix 14 (see Figure 5) of extended length, which helix may then be handled and used somewhat after the manner of a bar of stock, from which individual nut blanks are cut. Initially, the strip of material 13 is preferably of tapered section, as indicated at 15 at the left of Figure 5, the narrow edge of the strip being presented inwardly. This is of importance since in winding, the inner edge of the strip is thickened by plastic flow of the metal. Choice of an appropriate initial tapered section will, therefore, produce turns of parallel-sided section (shown at 16), which is preferred for reasons brought out above.

Figure 6:
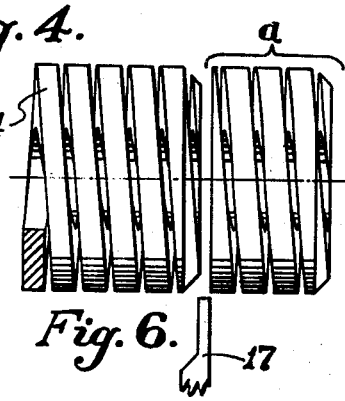

In Figure 6, I have illustrated a cutting tool 17 adjacent the point of separation of a nut blank a from the helix 14. The helix 14 (and thus each blank which is cut therefrom) is preferably wound with the convolutions thereof in the spaced relation desired in the finished article, the metal having sufficient flexibility and elasticity to permit of compression of each blank in the manner described below in connection with the shaping operations illustrated in Figures 7 and 8. The helix may be wound with spacing between the turns greater or less than that desired in the finished article and the characteristics of the metal controlled, as by heat treatment, so that after completion of the individual nut blank, the elasticity will again separate the turns, but to a greater or lesser degree of spacing than that present in the original winding.

Figure 7:
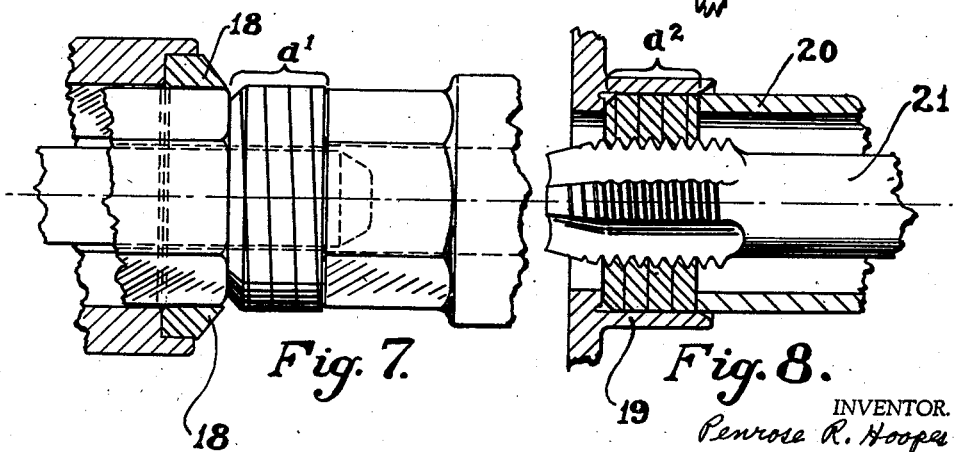

With either type of initial winding, each individual nut blank is compressed in an axial direction to close the convolutions of the helix, this condition being indicated at $a'$ in Figure 7, in which figure the blank appears in a suitable shaping or shearing tool in position just prior to being forced past the cutters 18 for cutting the outer cylindrical surface to the desired hexagonal or other polygonal shape. The internal cavity of the helix may also be bored or broached out to an accurate predetermined dimension, this also being done while the convolutions are in substantial contact with each other.

Figure 8:
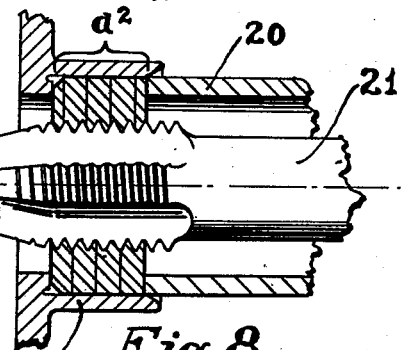

In Figure 8, the blank appears at $a^2$ (in axial section) inserted within a holder member 19 formed to engage the blank to prevent its rotation, being axially compressed therein by means of sleeve 20, and while held in this manner the blank is internally threaded as by means of a tapping tool 21.

It is of importance to note that both the diameter and pitch of the tapping tool are desirably the same as that normally used for a solid nut of given size, and that during the tapping operation the blank is held in axial compression. Any tendency for the nut to expand radially during tapping may be restrained by the side wall of the holder member 19.

In view of the described manner of shaping and tapping, the finished article when threaded onto a bolt, in effect, presents the appearance of a solid nut, both the external and internal contours of which are entirely uniform and undistorted.

Upon completion, desired physical characteristics may be imparted to the nut by any suitable form of heat treatment, and the nuts may also be provided with a surface finish of any kind, such as plating, anodizing, polishing or the like.

Threading of either hand may be tapped into a helix of either hand, the desired axial pressure on the interengaging threads of the nut and bolt being provided regardless of the relation between the hand of the helix and the hand of the thread. However, I prefer to employ a helix and thread of the same hand, since maximum solidity in the nut body is thereby provided when the nut is tightened.

I prefer also to employ a helix of greater angle than that of the thread, thereby enhancing the action of the mating threads to close the helix when the nut is threaded onto a bolt. This closing action progresses uniformly as the bolt thread enters the nut, each fraction of a turn of the nut being accompanied by the drawing in or closing of a corresponding portion of the helix.

A point of considerable advantage which is attained in accordance with this invention is that the entire height of the nut body is used not only for thread interengagement but also for locking.

Another advantage of the nut herein disclosed is that greater leeway is permissible in dimension tolerances, especially as between the diameter of the bolt and of the internal bore of the nut. The nut, being yielding throughout its length, will accommodate itself to the threading on the bolt, and will provide a high degree of locking force, even where the diameter of the bolt is appreciably smaller than the internal diameter of the nut.

Because of the distribution of the locking force over an extended length of interengaging threads of the nut and bolt, the nut may be removed and replaced many times without developing wear either on its own threads or on those of the bolt.

I claim:

1. A nut for use on a bolt of predetermined pitch, comprising an open spring helix of uniform pitch provided internally with a screw engaging thread of uniform pitch smaller than the pitch of said helix and different from the pitch of said bolt when the helix is in its free or expanded condition, the parts being so constructed and arranged as to cause the turns of the helix to be progressively and automatically compressed as the nut is threaded onto the bolt.

2. A nut for use on a bolt of predetermined pitch, comprising an open spring helix of uniform pitch provided internally with a screw engaging thread of uniform pitch smaller than the pitch of said helix and greater than the pitch of said bolt when the helix is in its free or expanded condition, the parts being so constructed and arranged as to cause the turns of the helix to be progressively and automatically compressed as the nut is threaded onto the bolt.

3. A nut for use on a bolt of predetermined pitch, comprising an open spring helix of uniform pitch provided internally with a screw engaging thread of uniform pitch smaller than the pitch of said helix and greater than the pitch of said bolt when the helix is in its free or expanded condition, the spacing between the turns of the helix being appreciably less than the thickness of said turns, and the helix and the thread both being of the same hand, whereby applying the nut to the bolt serves to automatically and progressively compress the turns of the helix and thus to place the thread of the bolt under axial pressure throughout the entire circumference of the bolt.

4. A nut for use on a bolt of predetermined pitch, comprising an open spring helix of uniform pitch provided internally with a screw engaging thread of uniform pitch smaller than the pitch of said helix and greater than the pitch of said bolt when the helix is in its free or expanded condition, the spacing between the turns of the helix being less than the axial distance between adjacent turns of the thread, and the helix and the thread both being of the same hand, whereby applying the nut to the bolt serves to automatically and progressively compress the turns of the helix and thus to place the thread of the bolt under axial pressure throughout the entire circumference of the bolt.

PENROSE R. HOOPES.